June 19, 1923.

A. J. GERRARD ET AL

1,459,623

MACHINE FOR MAKING BALE TIES

Filed June 14, 1922

Inventors
Alec J. Gerrard
and Parvin Wright by

Attorney

Patented June 19, 1923.

1,459,623

UNITED STATES PATENT OFFICE.

ALEC J. GERRARD AND PARVIN WRIGHT, OF CHICAGO, ILLINOIS.

MACHINE FOR MAKING BALE TIES.

Application filed June 14, 1922. Serial No. 568,306.

*To all whom it may concern:*

Be it known that we, ALEC J. GERRARD and PARVIN WRIGHT, respectively a subject of the King of Great Britain and a citizen of the United States, both residing at Chicago, in the county of Cook and State of Illinois, have invented certain new and useful Improvements in Machines for Making Bale Ties; and we do hereby declare the following to be a full, clear, and exact description of the invention, such as will enable others skilled in the art to which it appertains to make and use the same.

This invention relates to a machine for simultaneously straightening, and cutting a plurality of wires, and also placing loops in their ends, and has for its object to improve the machines of this character, heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a side elevational view of a machine made in accordance with this invention;

Figure 3 is a plan view of the parts shown in Figures 1 and 2;

Figure 5 is a sectional view taken on the line 5—5 of Figure 4, looking in the direction of the arrows;

Figure 6 is an enlarged detail view of the wire loop forming mechanism;

Figure 7 is an elevational view of the parts shown in Figure 6;

1 indicates any suitable framework preferably of the box like form shown, and mounted in this framework is a power shaft 2 operated from any suitable motor 3, and carrying the power pulley 4, over which passes the power belt 5. Said belt also passes over the driving pulley 6 rigid with the shaft 7, on which is mounted the driving pinion 8, all as will be clear from Figures 1, 2 and 4. The driving pinion 8 meshes with the gear 9 mounted on the shaft 10 which carries the gear 11 meshing with the gear 12, mounted on the shaft 13, carrying the gear 14, meshing with the gear 15, rigid with the shaft 16, all as will be clear from Figures 1 and 3. Mounted on the shaft 7 is a continuous roll 18 provided with a plurality of V-shaped groove members 19, 20, 21, 22 and 23. Alongside of each of said grooved members are respectively the gears 24, 25, 26, 27 and 28. Above said last mentioned gears are companion gears, 30—34, that is, with the gear 24 there meshes a gear 30; with the gear 25 there meshes a gear 31; with the gear 26 there meshes a gear 32; with the gear 27 there meshes a gear 33, and with the gear 28 there meshes a gear 34. These last mentioned gears are rigid respectively with the beveled and grooved sections 35, 36, 37, 38 and 39. Each of the grooved sections and its companion gear, for example, the grooved section 35 and its gear 30, are provided with short shafts 40, which are mounted on individual frames 41, 42, 43, 44 and 45. Each of these frames are alike, so that the description of one will serve for all.

As best shown in Figure 5, the frame 43 rests at one end on the rounded head 50 of the stud bolt 51, and has a sort of pivotal connection therewith. The other end of said frame 43 is provided with a set screw 52 which rests upon the bar 53 which is rectangular in cross section, and which is eccentrically pivoted as at 54. The result of this construction is that should the bar 53 be slightly turned, as it is in fact, the end 55 of the frame 43 will be slightly lifted on the rounded head 50 as a center and thus will the friction between the grooved member 37 and the grooved member 21 be lessened.

On the shaft 13 is provided a continuous drum 57, having the gear 14 at one end and a similar gear not illustrated, at its other end. This drum at intervals throughout its length and coinciding with the grooved members numbered from 19 to 23, is provided with cutting die members 58. On the shaft 16 is mounted another continuous companion drum 60 which at one end is provided with the gear 15 and at the other end with a companion gear 61, which meshes with the similar gear not shown, on the said drum 57. This said upper drum 60 is likewise provided at intervals registering with the grooved members numbered from 19 to 23, cutting die members 62, all as will be understood from Figure 5 of the drawings. Mounted on the frame work for oscillation on the pivots 54 is the above mentioned rectangular bar 53 which is located between the said pair of drums 57 and 60, and the drum 26 and its companion drum sections, lettered from 35 to 39, above described. Said oscillating bar 53 is provided at or near its middle with the rigidly attached arm or lever 64, provided with the roller 65, see Figures 3 and 5, and mounted on the said drum 60 is the cam member 66 adapted to move under said roller 65 and thus oscillate said bar 53 and to thus further oscillate the various frames numbered from 41 to 45. The bearings for the shafts 13 and 16 are carried in the bearing blocks 68 which are adjustable up and down in the ways 69 by means of the screw 70, all in the manner well known.

Figure 2:
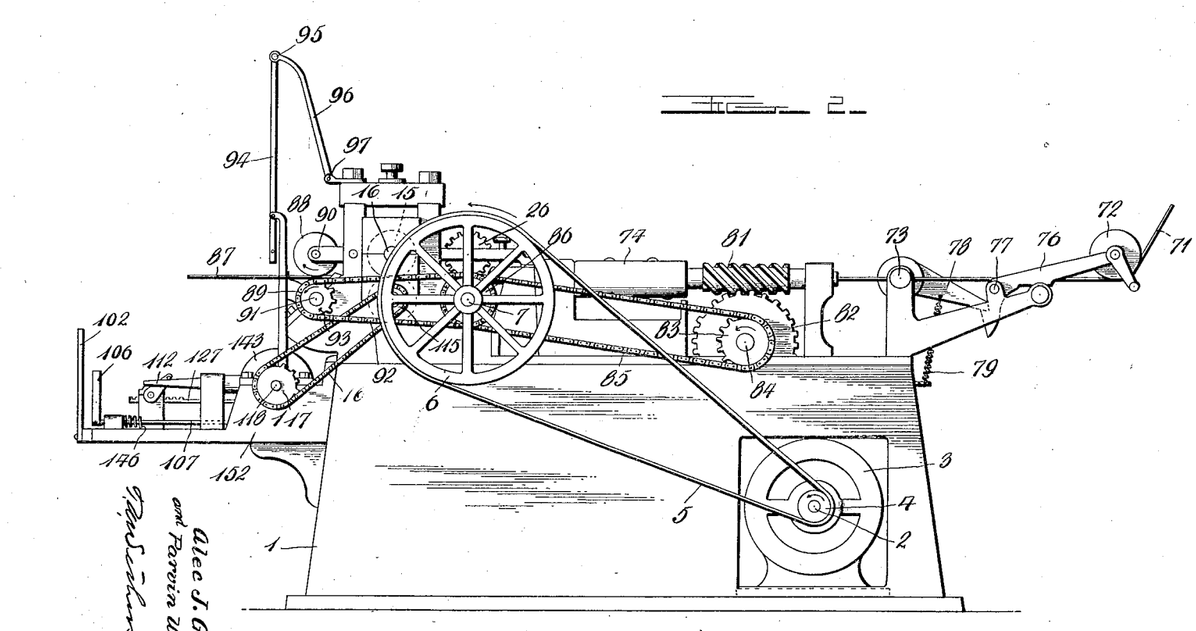
Figure 2 is a view of a machine similar to Figure 1, but looking in an opposite direction.
Figure 4:
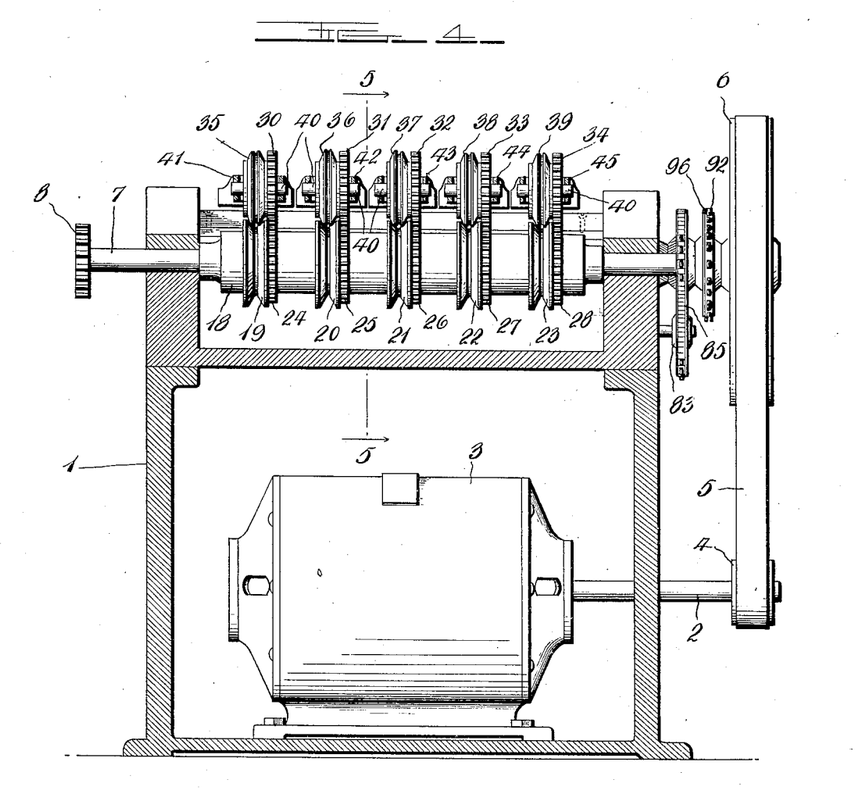
Figure 4 is a sectional view taken on the line 4—4 of Figure 1, looking in the direction of the arrows.

Referring now more particularly to Figures 1, 2 and 3, a plurality of wires 71 are drawn from coils not shown, under the pulleys 72, through the cutter members 73, through the wire straightening members 74, and between the grooved members lettered from 19 to 23, and the grooved members lettered from 35 to 39, as best shown in Figure 4.

The said last mentioned grooved members are frictionally engaged and are turned by their respective pairs of gears such for example as 24 and 30 and 25 and 31, 26 and 32, etc. They thus constitute feed members which pull the wires 71 through the straightening device 74, see Figure 5, and take out all kinks, etc., in said wires. These said feed members further push the wires between the drums 57 and 60, where they are cut into predetermined lengths depending upon the speed of rotation of the feed members and of the said drums. Should one or more of the wires 71 become kinked, knotted, or tangled, under ordinary conditions the machine would be clogged and the operator would have to stop the cutting of the other wire in order to clear it out. In this machine, on the other hand, when one or a plurality of wires become clogged, owing to the fact that a greater pressure is exerted on its particular pulley 72, it will lift the lever 76, turn it around its pivot 77, and thus release the trigger 78, which under the influence of the spring 79, will cause its cutter 80 to sever the particular wire or wires which have become entangled. The machine will accordingly go on operating as before, but will draw the cut wires through to the end where they may be thrown out. In other words, no stoppage of the machine as a whole will be incurred by the mere entanglement of one or two wires.

The wire straightening device 74 is provided with the worm 81 meshing with the gear 82, which is driven by the pinion 83 mounted on the shaft 84, and over which passes the sprocket chain 85 deriving its power from the pinion 86 rigid with the power shaft 7, all as will be clear from Figure 2.

The various wires 71 having been thus fed to and between the pairs of cutting dies, 58 and 62 it is necessary that the wires be stopped in their motion during the cutting action, and this is accomplished by the cam 66, lifting the roller 65, thus turning the bar 53 on its pivots 54, slightly lifting each of the upper grooved feed members numbered from 35 to 39. The lifting action is very slight, it is not enough to disengage the gear teeth of the gears lettered from 30 to 34 from their companion gears lettered from 24 to 28. In other words, the feed rolls continue to rotate as before, but the grip on the wires 71 is lessened sufficiently to enable said wires to stop during the cutting action of the dies 58 and 62. After the wires 71 have been thus straightened and cut into predetermined lengths, their cut ends or severed portions 87, Figure 5, are carried by the additional feed rolls 88 and 89 forward out of the cutting portion of the machine and into that portion of the machine which forms wire loops out of said ends.

That is to say, referring now more particularly to Figures 6 and 7, the feed roll 88 is an idler roll mounted on the shaft 90, while the feed roll 89 is mounted on the shaft 91, which receives its power from the sprocket chain 92 passing over the sprocket 96, see Figure 3, mounted on the power shaft 7, and the sprocket 93 mounted on said shaft 91, see Figure 2.

Prior to the severing of the wire ends 87, the wires 71 had been passed out in front of the machine, and rested on suitable supports not shown. Accordingly, these said wires have each passed through notches 90' in a plate 91', see Figures 6 and 7, which is supported by the bracket 92' from the frame 93' of the machine. Registering with each of the notches 90' are the forked lower ends 93 of a plurality of bars 94, whose upper ends are pivoted on the rod 95 and which bars do not hang vertically but are somewhat inclined, as illustrated in Figure 7. The bar 95 is carried by a pair of swinging supports 96', which are pivoted as at 97 to the framework, and which are adapted to swing from their full line positions shown in Figure 6 over into their dotted line position shown in said figure. Passing through the lower portions of each of the bars 94 is a horizontally disposed rod 99, which is supported in the upper ends of the pair of swinging bars 100, whose lower ends are pivoted as at 101 in the framework, as shown. These said swinging bars 100 likewise pass from their vertical positions shown in Figure 6 to their somewhat inclined positions shown in said figure, when said bar 95 is swung over as above described.

The effect of thus swinging the bars 96 and 100 into position shown, is to cause the various vertically disposed bars 94 to move into their new positions illustrated, in said Figure 6, and when they so move they carry the cut ends 87 of the wires 71 from the upper horizontal full line position shown in Figure 6 to the lower dotted line positions shown in said figure.

That is to say, when the notched lower ends 93 of the bars 94 descend onto the cut ends 87 of the wires, the notches frictionally engage said wires or grip the same and they thus bodily carry the said cut ends 87 from the upper position illustrated to the lower position, shown in dotted lines.

At the lower portion of Figures 6 and 7 is a plurality of guide supports 102 arranged in pairs and which provide a narrow space 103 between each pair. The upper ends of these supports 102 are flared as shown, and there is thus provided a space 103 for each wire end 87. These said spaces 103 are so positioned that they are in register with the notches 90' and therefore when the said wire ends 87 are carried from their upper full line positions into their dotted line position, they are passed by the vertically disposed rods 94 squarely into the said spaces 103, all as will be clear from Figures 7, 8 and 9.

Figure 8:
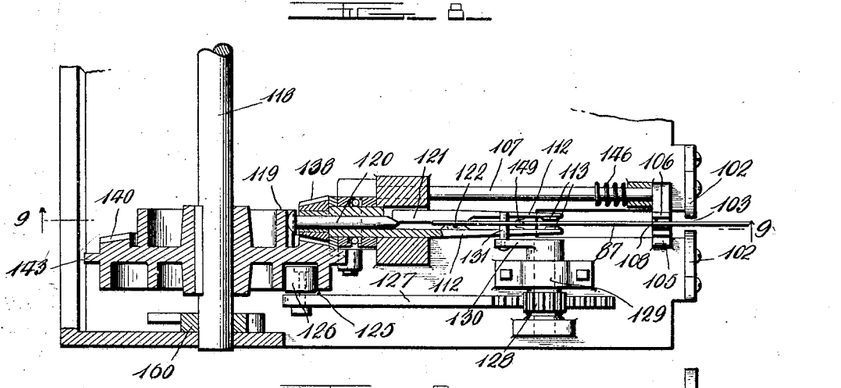
Figure 8 is a view taken on the line 8—8 of Figure 6, looking in the direction of the arrows.
Figure 11:
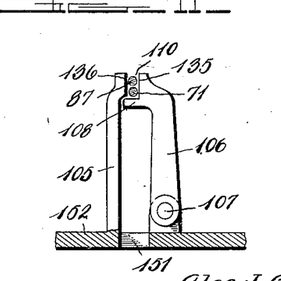
Figure 11 is a detail sectional view taken on the line 11—11 of Figure 9.

Associated with each space 103 is a rigid upright 105, see Figures 8 and 11, and co-acting with each upright 105 is a lever 106 pivoted on the shaft 107 and provided with the extended supporting lip 108, as shown. It thus results that as the wire ends 87 take up their dotted line position they rest upon the lower supporting lips 108 of the levers 106. In register with the space 110 between the levers 106 and the supports 105 is the forward projecting end 111 of the wire twister 112. As best shown in Figure 8, this said end of the twister is provided with the two lugs 113 which are normally open, but which are adapted to be closed at a certain period of the operation. But when a wire end 87 is first brought to the position above described, it passes down between the two lugs 113, and rests there, upon the pin 131, see Figure 8, to be presently described.

Figure 9:
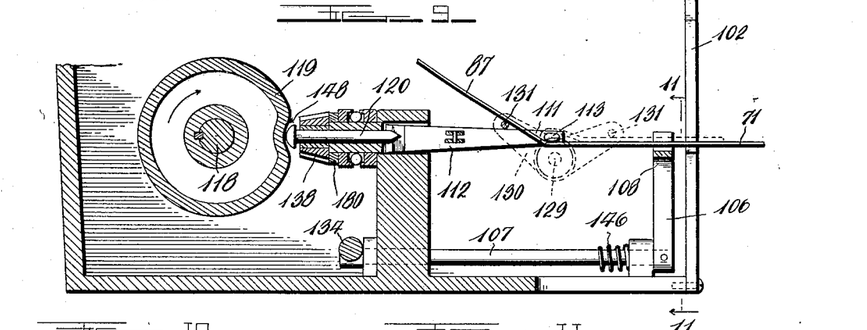
Figure 9 is a sectional view taken on the line 9—9 of Figure 8.
Figure 10:
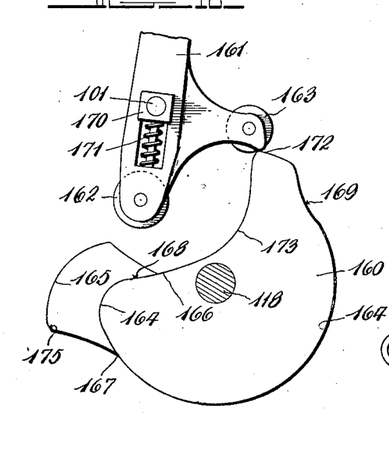
Figure 10 is an enlarged detail view of the cam mechanism illustrated in Figure 1.

Going back to Figure 2 of the drawings, there is mounted on the shaft 13 a sprocket 115, over which passes the sprocket chain 116, and this chain also passes over a sprocket 117 mounted on the shaft 118, which, as will be clear from Figures 8 and 9, and 10, is provided with a plurality of cams. One of said cams 119 is adapted to actuate or push inward a pin 120 carried by the twister 112, and the beveled end of this pin 120 turns the member 121 of the twister carrying one of the lugs 113 on its pivot 122. This action closes the gap between said lugs 113, and thus catches or holds the wire end 87, all as will be clear from Figures 8 and 9.

Also mounted on said shaft 118 is a cam groove 125 in which works a roller 126, carried by the rack bar 127 which upon being reciprocated by said cam, turns the pinion 128 mounted on the shaft 129, carrying the crank 130, and twisting pin 131, as best illustrated in Figures 8 and 9. This said roller 126 and rack bar 127 is conveniently supported by the pivoted member 142, as best shown in Figure 6. The rack bar 127 is also supported by a roller 147, as will be clear from Figures 6 and 7.

The turning of the twisting pin 131 through the requisite angle carries the cut end 87 of the wire from its full line position shown in Figure 9 over into its dotted line position alongside of the main body 71 of the wire. When this action has taken place, the cam 132, see Fig. 6, acts upon the roller 133 carried by the arm 134 rigid with the shaft 107 which turns said shaft, and with it turns the lever 106 to close the gap 110, see Figure 11, and thus pinch the two bights of the wire between the vertical surface 135 of the lever 136 of the stationary member 105. The closing of the lever surface against the stationary surface 136 holds the two bights of the wire 87 firmly clamped against turning, whereupon the loop already formed may be twisted in the manner now to be disclosed.

That is to say, the twister 112 carries the beveled pinion 138, see Figures 7, 8 and 9, which meshes with its appropriate beveled gear 140, mounted on the shaft 118, and the turning of said bevel gear rotates its appropriate twister, and thus is the loop formed with the wire end 87 rotated until its extreme end is twisted up with the main body 71 of the wire.

Figure 12:
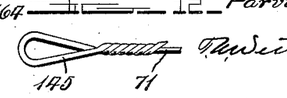
Figure 12 is a view of the loop formed in the wire by this machine.
Figure 13:
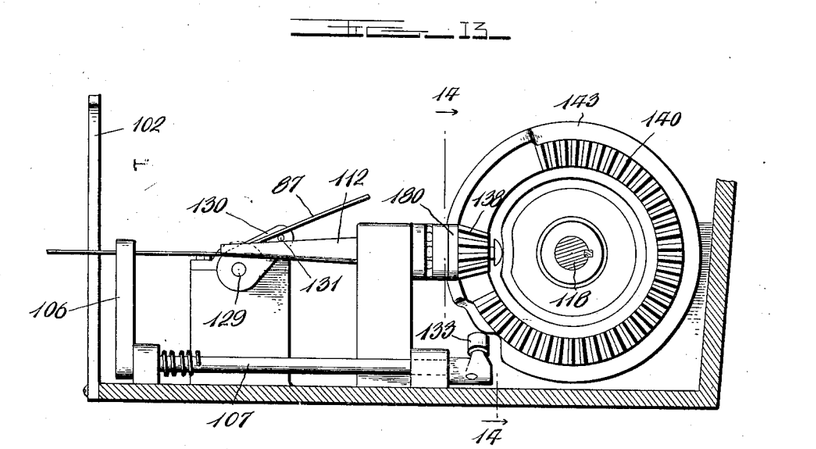
Figure 13 is a side elevational view of the twister mechanism.

The loop having been thus formed in the wire in the manner above described, this said loop is withdrawn from the machine, and the parts made ready for another operation as follows:

The bevel gear 140 is provided with the rim 143, see Figures 7, and 8, and on this rim is provided the cam surface 132 above referred to. Adjacent this said cam surface 132 is a second cam surface 144, see Figure 6, into which the roller 133 drops immediately after the loop 145 see Figure 12 has been made in the wire 71. As soon as the roller 133 drops into the cam depression 144, the spring 146, with which the shaft 107 is provided, retracts the lever 106 from its gripping position, and thus frees the bights 87 and 71 of the wire, as will be clear from Figure 11. The said bights 87 and 71 being thus freed from the gripping action of the lever 106, the parts are so timed that the cam 119 will have brought its depression 148 opposite the head of the pin 120, so that the spring 149 located between the jaws 111 of the twister 112, see Figure 8, will open said jaws by reason of the beveled end of the member 121 pushing the pin 120 back into the depression 148.

The wire loop 145 being now released, it can drop right on down through the space 150 between the guide bars 102 and through the space 151, in the base plate 152, and out of the machine.

In the meantime, the horizontal bars 95 and 99 and their associated frame members 96 and 100 are returned to their original full line positions shown in Figure 6, by the following means: On the extreme ends of the shaft 118 are the cams 160 and each of the swinging bars 100 are provided on their lower ends 161 extending beyond their pivots 101, with rollers 162 and 163. The cams 160 have two cam surfaces rigid with each other. The one surface 164 is followed by the roller 163, and the other surface 165 is followed by the roller 162. The two surfaces 164 and 165 merge into each other at the points 166 and 167, while the surface 164 continues on around through an angle of 536° as illustrated.

The cams 160 turn in a clockwise direction, as seen in Figure 10, and the swinging levers 100 being in the inclined positions shown in Figure 6, the rollers 163 are struck by the surface 164 at or about the point 168. In the meantime, the surfaces 165 have passed the rollers 162 and the rollers 163 being in a plane different from the rollers 162 said surfaces 165 pass under or to one side of said rollers 163.

It thus results that when the point 168 of the surfaces 164 strike said rollers 163, the swinging levers 100 are turned on their pivots 101, and are restored to their vertical positions illustrated in Figure 6. The cams 160 continue to rotate and the surfaces 164 remain in contact with the rollers 163 until the points 169 are reached, whereupon the swinging levers 100 will tend to be forced in a direction toward the left as seen in Figure 6, but as they are already jammed up against the plate 91, they cannot be moved any farther toward the left, and therefore they are moved vertically upward by reason of the fact that their pivots 101 are located in the slidable bearings 170, which are controlled by the compression springs 171.

The rising of the said swinging arms 100 continues until the rollers 163 pass over the extreme upper points 172 of the cams, whereupon the said rollers may fall vertically under the action of gravity along the steeply inclined surfaces 173 of the cams, but should they fail to fall by gravity for any reason, the surfaces 165 almost immediately contact with the rollers 162 and thus force the swinging levers 100 into their downwardly inclined positions. The surfaces 165 continue to act upon the rollers 162 until the point 175 is reached, whereupon the rollers 163 contact with the points 168, and the above operation is repeated.

The lifting of the swinging levers 100 by those portions of the cams 160 between the point 169 and 172 accomplishes the following useful purpose.

The wire straightening and cutting machine has been running while the cams 160 are thus rotating, and they have projected out through the notches 90 in the plate 91, additional lengths of wire 71. The vertically disposed rods 94 have been drawn up so that their notches 93 will lie above said wire ends 87 and it is desirable that they be jammed down so as to firmly grip said wire ends 87. Accordingly, after the swinging levers 100 have thus been lifted so as to bring the vertical rods 97 into the positions shown in Figure 7, the springs 171 suddenly jam down said swinging levers 100 and carry with them the vertically disposed rods 97, to the end that the notches 93 seize or grip the wire ends 87, and thus carry them from their full line positions shown in Figure 6 to their dotted line positions in the manner above disclosed.

The parts of the machine are now in position to repeat the formation of the different loops in the manner first described.

The twisting mechanism 112 should always occupy such a position that its holding lugs 113 will be uppermost and ready to receive the wire ends 87 therebetween. The beveled gear 140 operating the twisting gear 138 is necessarily mutilated because there must be a dwell in the rotation of the twisting barrel 112 in order that the wire loop may be formed.

Figure 14:
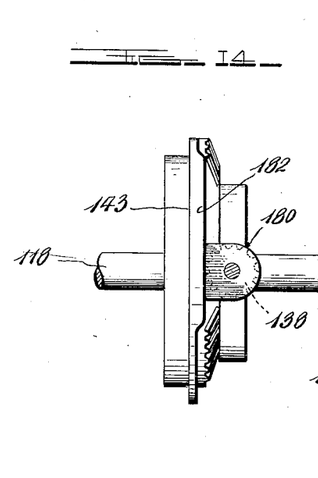
Figure 14 is a sectional view taken on the line 14—14 of Figure 13, looking in the direction of the arrows.
Figure 15:
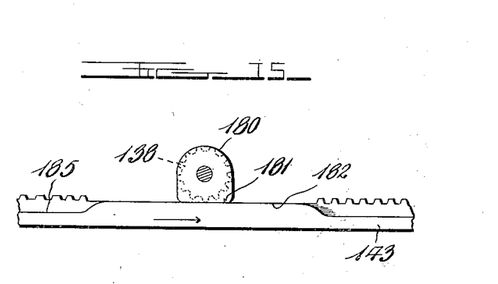
Figures 15 and 16 are detail views showing the cam in different positions in relation to the twisting mechanism.
Figure 16:
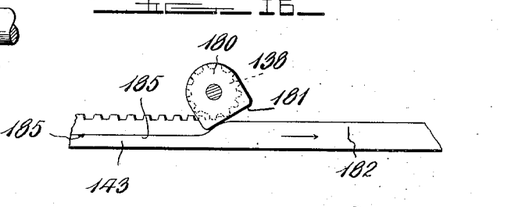

Accordingly, to prevent the twister barrel 112 from turning and thus getting the holding lugs 113 out of their proper position during the period of dwell, we provide said twister barrel with the collar like portion 180 which has a flat lower surface 181, see Figures 15 and 16, and which surface rides upon the raised rim or projection 182, with which the rim 143 is provided. During the period of rotation of said twister barrel 112, however, the collar like means 180 must rotate with the pinion 138, and the parts are so proportioned as to permit this. That is to say, in Figures 14, 15, and 16 it will be observed that the rim 143 of the bevel gear 140 is provided with the depression 185, which is deep enough to permit the collar like member 180 with its flat surface 181 to rotate freely. On the other hand, when said pinion 138 approaches its period of dwell said flat surface 181 rolls up on the incline 186, which joins the raised surface 182 with the depressed surface 185, and thus is the barrel 112 held firmly in position while receiving the wire 87 preparatory to forming the loop.

It is obvious that those skilled in the art may vary the details of construction as well as the arrangement of parts, without departing from the spirit of the invention, and therefore we do not wish to be limited to the above disclosure except as may be required by the claims.

What is claimed is:

1. In a machine for forming loop ended bale ties the combination of a wire straightening means; a wire feeding means for forcibly drawing the wire through said straightening means; means to cut the wire after a predetermined length has been drawn by said feeding means; means to move the cut wire from said cutting means; means comprising a depending swinging member to forcibly move the cut wire end in position to be bent into a loop; means for looping over the bight of said cut end alongside of a bight of the main body portion of the wire; and means to rotate the looped wire end to twist said bights together, substantially as described.

2. In a machine for forming loop ended bale ties the combination of a wire straightening means; a wire feeding means for forcibly drawing the wire through said straightening means; automatic means for cutting a tangled wire strand before it reaches the wire straightening means; means to cut the wire after a predetermined length has been drawn by said feeding means; means to move the cut wire from said cutting means; means to forcibly move the cut wire end in position to be bent into a loop; means for looping over the bight of said cut end alongside of a bight of the main body portion of the wire; and means to rotate the looped wire end to twist said bights together, substantially as described.

3. In a machine for forming loop ended bale ties the combination of a wire straightening means; a wire feeding means for said straightening means; means to cut the wire after a predetermined length has been drawn by said feeding means; means for automatically stopping the movement of the wire during the cutting operation; means to move the cut wire from said cutting means comprising a depending swinging member; means to forcibly move the cut wire end in position to be bent into a loop; means for looping over the bight of said cut end alongside a bight of the main body portion of the wire; and means to rotate the looped wire end to twist said bights together, substantially as described.

4. In a machine for forming loop ended bale ties the combination of a wire straightening means; a wire feeding means for forcibly drawing the wire through said straightening means; means to cut the wire after a predetermined length has been drawn by said feeding means; means to move the cut wire from said cutting means; means comprising a depending swinging member to grip and forcibly move the cut wire end in position to be bent into a loop; means for looping over the bight of said cut end alongside the bight of the main body portion of the wire; means to hold portions of said bights against rotation; and means to rotate the looped wire end to twist other portions of said bights together, substantially as described.

5. In a machine for forming loop ended bale ties the combination of a wire straightening means; a wire feeding means comprising rotating surfaces frictionally engaging the wire for forcibly drawing the wire through said straightening means; rotating means to cut the wire after a predetermined length has been drawn by said feeding means; means carried by said cutting means for lessening the friction between the feeding means and said wire during the cutting operation; means comprising a pair of rollers to move the cut wire from said cutting means; means comprising a vertically disposed movable bar adapted to forcibly move the cut wire end in position to be bent into a loop; means for looping over the bight of said cut end alongside a bight of the main body portion of the wire; and means to rotate the looped wire end to twist said bights together, substantially as described.

6. In a machine for forming simultaneously a plurality of loop ended bale ties the combination of a plurality of wire straightening means; a plurality of wire feeding means for forcibly drawing the wire through said straightening means; means to cut the wire after a predetermined length has been drawn by each of said feeding means; means to move the cut wire from said cutting means; means comprising a plurality of depending swinging gripping devices to forcibly move the cut wire ends in position to be bent into loops; means for looping over the bight of said cut ends alongside of bights of the main body portions of the wire; and means to rotate the looped wire ends to twist said bights together, substantially as described.

7. In a machine for forming loop ended bale ties the combination of a plurality of wire straightening means; an automatic wire cutting means for each straightening means adapted to sever a tangled wire strand before its tangled portion reaches said straightening means; a plurality of pairs of rotating surfaces adapted to frictionally engage and feed the said wire strands; means for automatically raising one friction surface in each pair to stop the feeding action during the cutting operation; feed rolls for moving the cut wire ends from between the cutting dies; a pivoted swinging frame provided with depending wire engaging members to forcibly carry said wire ends into positions to be looped; rotating means for forming loops in said wire ends; and twisting means for twisting two bights of the looped portions of wire together, substantially as described.

8. In a machine for forming loop ended bale ties the combination of a plurality of wire straightening means; an automatic wire cutting means for each straightening means adapted to sever a tangled wire strand before its tangled portion reaches said straightening means; a plurality of pairs of rotating surfaces adapted to frictionally engage and feed the said wire strands; means for automatically raising one friction surface in each pair to stop the feeding action during the cutting operation; feed rolls for moving the cut wire ends from between the cutting dies; a pivoted swinging frame provided with depending wire engaging members to forcibly carry said wire ends into positions to be looped; rotating means for forming loops in said wire ends; and twisting means comprising a rotating pair of lugs adapted to hold the wire and a head provided with a gear for rotating said lugs, for twisting two bights of the looped portions of wire together, substantially as described.

9. In a machine for forming loop ended bale ties the combination of a wire straightening means; a cutting means; depending swinging means for positioning the cut ends of the wire in the looping mechanism; means for forming a loop of the cut end of a wire; means for holding a portion of the looped bights of the wire against rotation; and means for twisting together other portions of said bights, substantially as described.

10. In a machine for simultaneously forming a plurality of loop ended bale ties, the combination of a plurality of wire straightening means; a plurality of wire cutting means; a plurality of depending swinging means for positioning the cut ends of the wires in the looping mechanism; a plurality of means for simultaneously forming loops of the cut ends of a plurality of wires; a plurality of means for holding portions of the looped bights of wire against rotation; and a plurality of means for twisting together other portions of said bights, substantially as described.

11. In a machine for simultaneously forming a plurality of loop ended bale ties, the combination of a plurality of wire straightening means; a plurality of wire cutting means; a plurality of means for simultaneously forming loops of the cut ends of a plurality of wires comprising a swinging frame having wire engaging members; a plurality of means for holding portions of the looped bights of wire against rotation comprising swinging levers; and a plurality of means comprising rotating wire holding lugs for twisting together other portions of said bights, substantially as described.

12. In a machine for simultaneously forming a plurality of loop ended bale ties, the combination of a plurality of wire straightening means; a plurality of wire cutting means; a plurality of means for simultaneously forming loops of the cut ends of a plurality of wires, comprising movable gripping means and rotatable wire engaging means; a plurality of means for holding portions of the looped bights of wire against rotation; and a plurality of means comprising a rotatable barrel provided with wire holding lugs and gears for rotating said lugs; for twisting together other portions of said bights, substantially as described.

13. In a machine for forming loop ended bale ties, the combination of a swinging frame provided with means to grip the end of a wire; a loop twisting barrel provided with separated lugs adapted to have the wire passed between them; means for closing said lugs over said wire; means for bending a bight of the wire end back onto a bight of the wire after said lugs are closed; means for holding a portion of said bights against rotation; and means for twisting together another portion of said bights, substantially as described.

14. In a machine for forming loop ended bale ties the combination of a swinging frame provided with means comprising a depending notched bar to grip the end of a wire; a loop twisting barrel provided with a rotating head and separated lugs adapted to have the wire passed between them; slidable means for closing said lugs over said wire; means for bending a bight of the wire end back onto a bight of the wire after said lugs are closed; means for holding a portion of said bights against rotation; and means for twisting together another portion of said bights, substantially as described.

15. In a machine for forming loop ended bale ties, the combination of a swinging frame provided with means to grip the end of a wire; a loop twisting barrel provided with separated lugs adapted to have the wire passed between them; means for closing said lugs over said wire; means comprising a rotating arm for bending a bight of the wire end back onto a bight of the wire after said lugs are closed; means comprising a lever for holding a portion of said bights against rotation; and means for twisting together another portion of said bights, substantially as described.

16. In a machine for simultaneously forming a plurality of loop ended bale ties, the combination of a plurality of means for moving the wires; a plurality of pairs of separated lugs between which the wires are moved; means for closing said pairs of lugs over the wires; a plurality of means for moving the end bights of the wires over alongside adjacent bights to form a plurality of loops; a plurality of means for holding portions of each pair of bights against rotation; and a plurality of twisting means for twisting together other portions of each pair of bights, substantially as described.

17. In a machine for simultaneously forming a plurality of loop ended bale ties, the combination of a plurality of wire gripping means for moving the wires; a plurality of pairs of separated lugs between which the wires are moved; automatic means for closing said pairs of lugs over the wires; a plurality of rotating means for moving the end bights of the wires over alongside adjacent bights to form a plurality of loops; a plurality of pivoted means for holding portions of each pair of bights against rotation; and a plurality of rotating twisting means for twisting together other portions of each pair of bights, substantially as described.

18. In a machine for making loop ended bale ties, the combination of a wire straightening means; means to force the wire to be looped through said straightening means; and means to automatically cut a tangled wire before it reaches said straightening means; substantially as described.

19. In a machine for making loop ended bale ties, the combination of a wire straightening means; means to force the wire to be looped through said straightening means; means to automatically cut a tangled wire before it reaches said straightening means; means to cut the straightened wire into predetermined lengths, substantially as described.

20. In a machine for making loop ended bale ties, the combination of a wire straightening means; means to force the wire to be looped through said straightening means; means to automatically cut a tangled wire before it reaches said straightening means; and means to cut the straightened wire into predetermined lengths; and means to form a loop of the cut end of said wire, substantially as described.

21. In a machine for simultaneously making a plurality of loop ended bale ties, the combination of a plurality of wire straightening means; a plurality of feeding means; a plurality of wire cutting means adapted to sever tangled strands before entering said straightening means; and a plurality of means for cutting the wires into predetermined lengths preparatory to forming the loops, substantially as described.

In testimony whereof we affix our signatures.

ALEC J. GERRARD.
PARVIN WRIGHT.